United States Patent [19]

Gindi et al.

[11] 3,919,483

[45] Nov. 11, 1975

[54] PARALLEL MULTIPLEXED LOOP INTERFACE FOR DATA TRANSFER AND CONTROL BETWEEN DATA PROCESSING SYSTEMS AND SUBSYSTEMS

[75] Inventors: Abraham M. Gindi, San Jose; Donald J. Lang, Cupertino, both of Calif.

[73] Assignee: International Business Machines Corporation, New York, N.Y.

[22] Filed: Dec. 26, 1973

[21] Appl. No.: 427,970

[52] U.S. Cl. .......................... 179/15 AL; 340/172.5

[51] Int. Cl.² .......................................... H04J 3/08

[58] Field of Search .............. 340/172.5; 179/15 AL

[56] References Cited

UNITED STATES PATENTS

| | | | |
|---|---|---|---|
| 3,303,475 | 2/1967 | Hellerman | 340/172.5 |
| 3,336,582 | 8/1967 | Beausoleil | 340/172.5 |
| 3,633,169 | 1/1972 | Bickford | 179/15 AL X |
| 3,639,904 | 2/1972 | Aruldragasam | 179/15 AL X |
| 3,659,271 | 4/1972 | Collins | 340/172.5 |

*Primary Examiner*—Ralph D. Blakeslee
*Assistant Examiner*—David L. Stewart
*Attorney, Agent, or Firm*—Owen L. Lamb

[57] ABSTRACT

A communication mechanism in which subsystems are attached in a closed loop. Communication between subsystems is accomplished by allocating time slots in both input and output directions by means of an interface controller which allocates time slots to the individual subsystems without regard to their position on the loop.

Simplex frame request lines allow subsystems in the loop to request service on an individual basis. Means are provided to simultaneously allocate frames to different devices, one reading and one writing. Outgoing frames are transmitted from the control unit to the first subsystem and from the first subsystem to subsequent subsystems in parallel. The first subsystem generates an incoming frame which is transmitted to each successive subsystem in parallel and from the last subsystem back to the controller to complete the loop.

11 Claims, 18 Drawing Figures

PARALLEL MULTIPLEXED LOOP INTERFACE FOR DATA TRANSFER AND CONTROL BETWEEN DATA PROCESSING SYSTEMS AND SUBSYSTEMS

FIELD OF THE INVENTION

The invention relates to data processing systems and more particularly to apparatus for communication between data processing systems and subsystems.

Many present day computers utilize a parallel demand/response interface between the data processing system and subsystem of the type described in U.S. Pat. No. 3,336,582 — Interlocked Communication System — Beausoleil et al. which issued Aug. 15, 1967. In this type of interface, units are connected in a multi-drop manner by means of an interface which interconnects all of the systems in parallel. A serial line called select out forms a closed loop entering the first unit in physical position and propagated to the next unit and successively through all units and then fed back to the originating unit as a select in line. This line is used to select the units on a positional priority basis. The first unit which wants to seize the interface inhibits the propagation of select out to the next lower unit downstream and thereby seizes the interface. This type of system has the disadvantage of requiring a large number of parallel lines interconnecting each of the subsystems and therefore, results in a maze of input/output cables interconnecting computer modules.

To avoid this, systems have been connected in a loop such as that described in co-pending patent application Ser. No. 319,260 — Multiple Station Receiver Controlled Transmission Loop Interface For Data Transfer and Control Between Data Processing Systems and Subsystems — Broadhurst et al. filed Dec. 29, 1972. In that system, subsystems are attached in a closed loop by means of a single wire threading through each of the subsystems and propagated from one subsystem to the next. There are three types of frames used, full, empty and idle. The frames are held in a parallel buffer-like form and are transmitted between units attached to the loop interface in bit serial form. The serial interface contains several independent bit streams so that several frames may be in transit simultaneously via different bit streams. This requires a single wire for each bit stream. Each serial interface bit stream has a single controller which provides bit clocking and frame synchronization for its bit stream. All the other attached units monitor this bit stream and they may send information in the bit stream in accordance with a frame protocol. Thus, each bit stream is a distributed multi-point line passing from unit to unit in a loop manner.

The full frames are used to transfer data or control information by a demand/response discipline. Thus, for each demand frame transmitted, there is an associated response frame.

This system, while it overcomes the disadvantages of the multicables of the parallel interface system while still retaining the demand/response frame, results in poor frame distribution because the demand/response frames are generated and controlled in a random manner.

It is therefore an object of the present invention to provide a communication mechanism for data processing systems in which a multi-line multiplex cable passes from one subsystem to the next subsystem in a chained manner.

A further object of this invention is to provide an input/output interface in which there is no positional priority and in which downstream devices are not preempted from service by upstream devices.

A further object of this invention is to provide a subsystem interface for connecting a number of subsystems which results in a higher utilization of the available bandwidth on the interface.

A further object of the invention is to provide a means for allocating bandwidths among a number of systems attached together and to a controller.

Briefly, the above objects are accomplished in accordance with the invention by providing a communication mechanism between computer subsystems and a data processor in which a parallel multiplexed outgoing data path connects the subsystems in a chain and an incoming data path connects the subsystems in a chain which closes the loop back to the data processor. A simplex frame request line is provided from each subsystem to the data processing system so that any subsystem can request service which may be granted by the data processing system without regard to the position of the unit in the loop.

Each unit of data transfer is constrained within a time frame defined by a frame clock that is transmitted on the outgoing lines. The frame clock divides each frame in half. During the first half of each frame, two sets of addresses are conditioned on the outgoing bus to identify the write address of write data or commands appearing on the outgoing bus and a read address to identify read data or sense data that is to appear on the incoming bus from the subsystem.

Addresses are valid during the first half of each frame and read and write data are valid during the second half of each frame. Write data is transmitted on the outgoing frame with an optional bus width of one, two or more bytes. The incoming frame contains the read data bus which may also consist of one, two or more bytes.

A simplex request line is assigned to each subsystem and is pulsed once for each request during the second half of any frame as defined by the frame clock. Since one or more subsystems may request at the same time, these requests are put into a queue at the controller and the subsystem with the largest number of requests is assigned the next outgoing frame so that priority is allocated on the basis of utilization rather than position in the loop.

This system organization has the advantage that any subsystem may be logically removed from the loop without interrupting data transfer. The system has the further advantage that each frame may contain read and write information simultaneously from any two subsystems. Furthermore, every frame may be utilized to carry read, write, control or sense information; no empty frames being necessary to allow read and request information.

As will become apparent from the following description, this interface allows dynamic frame allocation, pipelining of data, priority based on demand rather than on physical position in the loop, an optimum utilization of data rate capability, and expandable bus width and byte multiplex capability.

The foregoing and other objects, features and advantages of the invention will be apparent from the following more particular description of a preferred embodiment of the invention as illustrated in the accompanying drawings.

DETAILED DESCRIPTION

Figure 1:
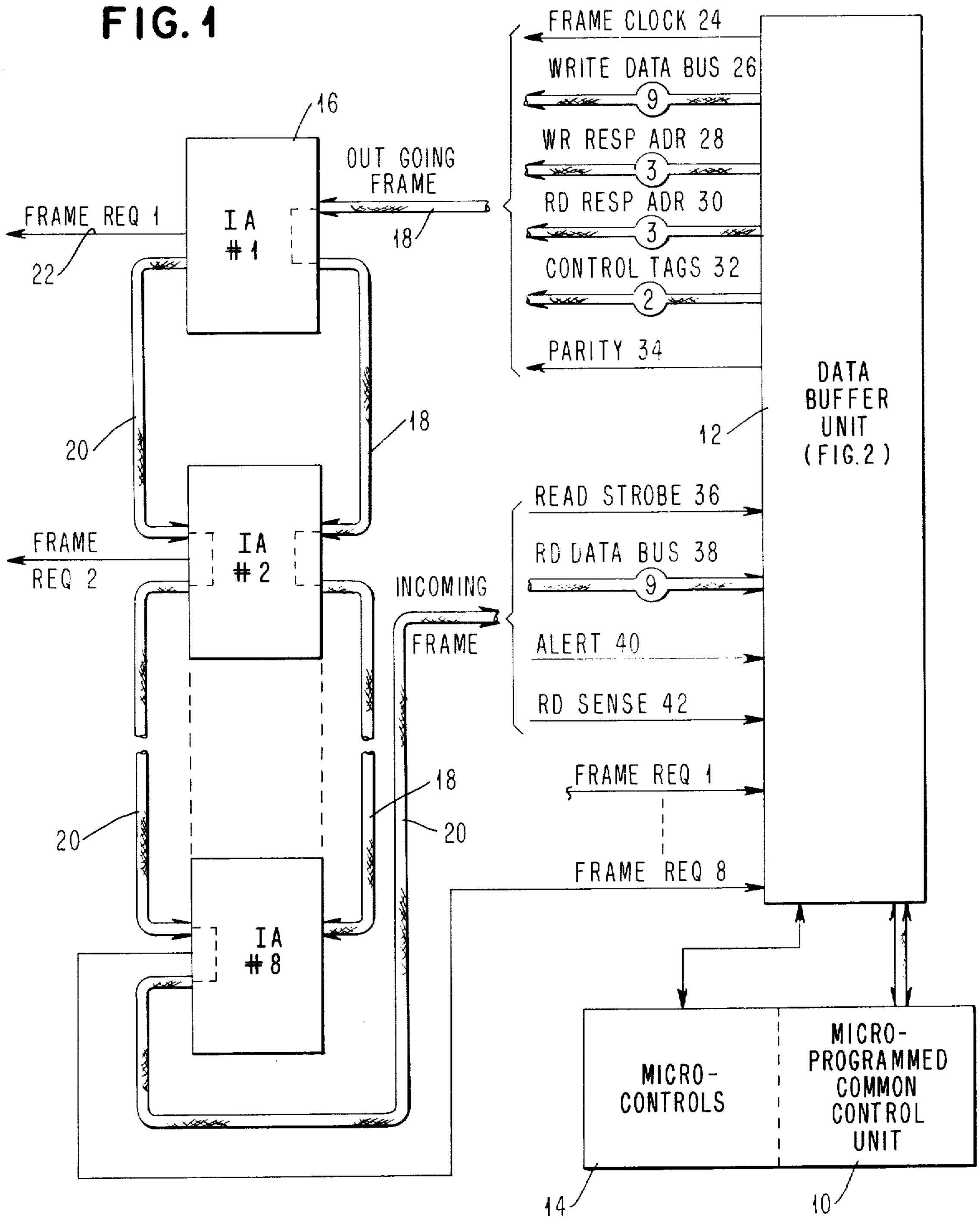
FIG. 1 is a schematic drawing showing a data processing system in which the invention is embodied.

Referring to FIG. 1, an overall block diagram of a data processing system embodying the invention is shown. A microprogrammed common control unit 10, of the type described in U.S. Pat. No. 3,673,575, entitled "Microprogrammed Common Control Unit With Double Format Control Words", Burton et al., issued June 27, 1972, is connected to a data buffer unit 12 with micro controls 14 provided for controlling the transfer of data between the two units. Input/output subsystems referred to as interface adapters (IA) are connected to the data buffer unit (DBU) by means of an outgoing frame cable 18 which connects all of the interface adapters 1 through 8 in parallel. An incoming frame cable 20 originates at interface adapter number 1 and connects each successive interface adapter in parallel and is fed back from interface adapter number 8 to the data buffer unit. Each interface adapter also generates a frame request line 22 which is fed directly to the data buffer unit. The incoming and outgoing cables between IA's are equal in order to maintain proper frame timing to ensure proper sequencing of frames in the incoming cable.

The outgoing frame bus 18 is comprised of the following lines: a frame clock line 24, a nine wire write data bus 26, a three wire write response address bus 28, a three wire read response address bus 30, two control tags 32 and a parity line 34.

The incoming frame bus 20 is comprised of the following lines: a read strobe line 36, a nine wire read data bus 38, an alert line 40 and a read sense line 42.

The function of each of the interface lines is described below.

Frame Clock — defines a time frame for each unit of data transfer transmitted among the outgoing lines and consists of a square wave which divides each frame in half.

Write Data Bus — nine lines which carry a byte of data. These lines are expandable to one, two or more bytes.

Write Response Address — a three bit bus which defines to which interface adapter the accompanying write data on the write data bus belongs. Read Response Address — a three bit bus carrying address lines which define which interface adapter may place read data on the incoming read data bus.

Control Tags — carries control information to the interface adapter.

Parity — provides a parity check on the write and read response address lines and the control tags. The write data and read data are parity checked within the write bus and read data bus. Each is a nine bit bus which comprises eight data bits plus a parity bit.

INCOMING FRAME

Read Strobe — the read strobe line is pulsed when the interface adapter places read data on the read data bus to indicate that the data is valid.

Read Data Bus — a nine line bus for carrying an eight bit read data byte plus a parity bit. The read data bus does not have to be equal to the write data bus and, in fact, they may be different to reflect differences in the ratio of read to write operations. The bus is expandable to 2, 3 or more bytes.

Alert — this line is pulsed by the interface adapter when it recognizes its address on the write response address line. It causes the DBU to switch that IA from write mode to read mode and resets all requests in the corresponding queue except one which becomes a read request. The alert line ends a command or a write transmission and requests a read frame for the purpose of returning status to the controller.

Read Sense — after the last byte is transmitted during a read or write operation, a read frame is requested and a status byte indicating the end of transmission is placed on the read data bus. The read sense line is pulsed instead of read strobe thereby indicating that the byte is a status byte.

Frame Request Lines 1 – 8 — each interface adapter is provided with a simplex frame request line. The request line assigned to the interface adapter is pulsed once for each request during the second half of any frame as defined by the frame clock.

DATA BUFFER UNIT

Figure 2:
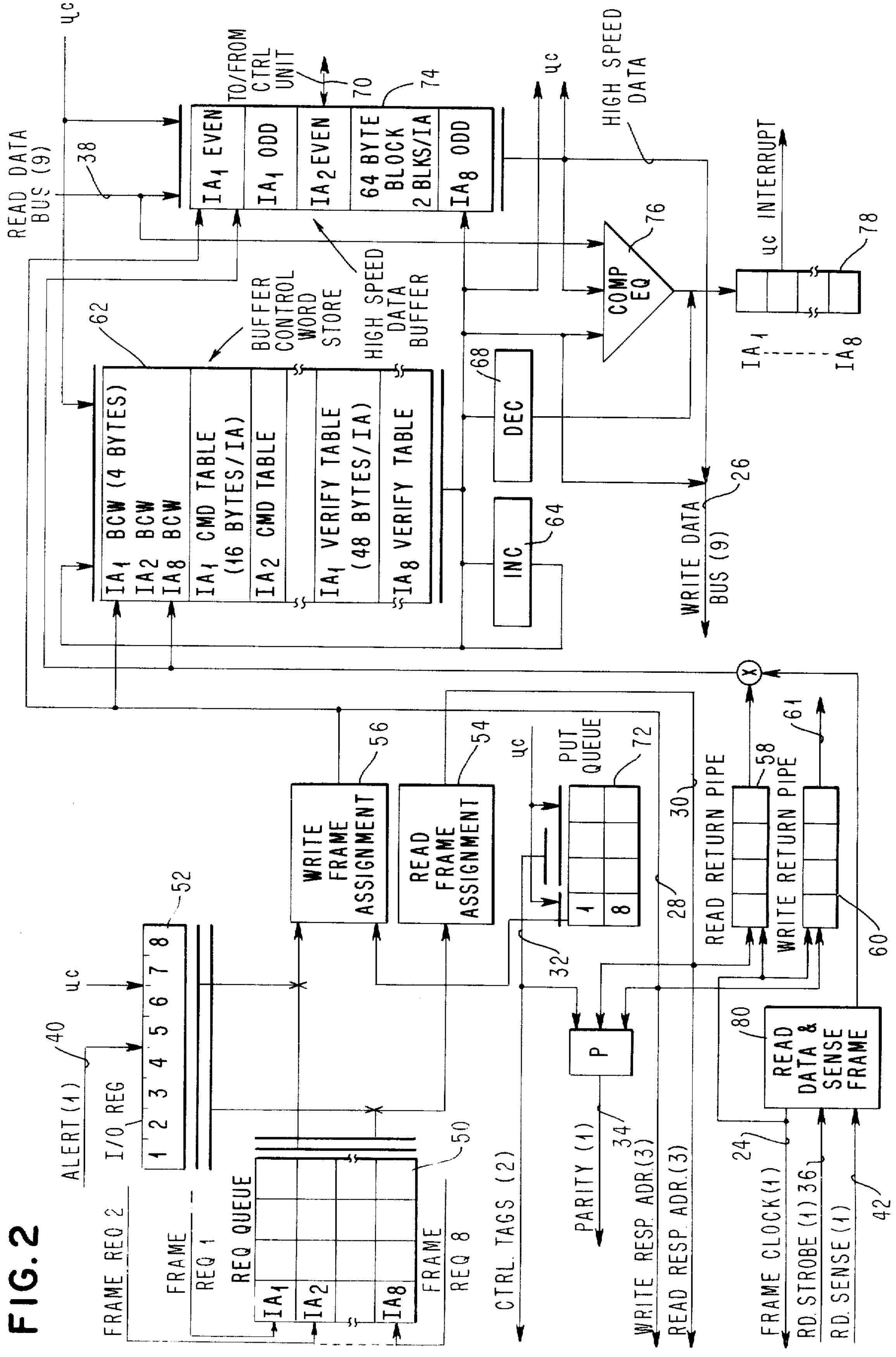
FIG. 2 is a more detailed block diagram of the data buffer unit shown in FIG. 1.

Referring now to FIG. 2, the data buffer unit will be described.

Request queue 50: the request queue comprises a number of items in a pushdown stack equal to the maximum number of interface adapters attachable to the system. Eight such adapters are shown for illustration. Each register in the stack is connected to the frame request line of an associated interface adapter. A register stores a one bit each time the associated interface address request line is pulsed. Whenever the write frame assignment logic 56 or read frame assignment logic 54 responds to a request in the stack, one bit is subtracted from the corresponding register contents. The register with the largest number of requests outstanding is assigned the next outgoing frame. Other frame assignment algorithms may be used such as giving priority to certain interface adapters (IA's) over others.

Input/Output Register 52: this is a register holding eight bits, each one associated with a respective interface adapter. The bit indicates the direction of information flow with respect to the corresponding interface adapter. A zero bit indicates a write operation and a one bit indicates a read operation. The bits are normally set to a one unless a command or write data is to be sent out to the interface adapter. The alert line 40, when pulsed, switches the appropriate register bit from a zero to a one thereby changing the corresponding interface from write mode to read mode. The alert pulse also resets all requests in the corresponding register of the request queue 50 except one request which becomes a read request. The alert line is pulsed by an interface adapter only when the adapter has recognized its address on the write response address line. The identification of the interface adapter generating the alert pulse (since this is a multiplex line) is determined at the data buffer unit by the output 61 of the write return pipe 60, described subsequently. The alert signal ends a command or write transmission and requests a read frame for the purpose of returning status information.

Read Frame Assignment Logic 54: this logic consists of a queue pointer (read pointer) and associated controls. It scans all the request registers in pushdown stack 50 that are in read mode and assigns read frames to the register with the largest number of requests. In the case of no read request, it sends zero address. The interface adapter assigned to zero ignores this address if it has no outstanding request.

Write Frame Assignment 56: this logic comprises a queue pointer (write pointer) and associated controls. It scans the request registers in pushdown stack 50 that are in write mode as determined by the I/O register 50 and services the register with the largest number of requests first. When servicing a write request, a corresponding buffer control word (BCW) is fetched from the buffer control word store 62, described below. A displacement field in the BCW together with the interface adapter address forms the address in the high speed data buffer 74 from which a byte is fetched and transmitted on the write data bus. The interface adapter address is transmitted on the write response address bus 28 and is stored in the write return pipe 60.

Read Return Pipe 58: the read return pipe is a shift register whose length is equal to the delay in the interface loop. When a read response address is sent via line 30 on the loop, it is stored into the pipe 58. The address is then shifted with each frame clock pulse 24. When the associated interface adapter returns a read strobe or a sense pulse, the output of the read return pipe identifies the source of the read or sense data on the read data bus 38. The corresponding BCW is fetched and this provides a displacement address which, together with the interface adapter address, supplies the high speed data buffer 74 with an address at which the read data is to be stored.

Write Return Pipe 60: The write return pipe is similar to the read pipe except that it is used to identify the source of an alert pulse 40.

Buffer Control Word (BCW) Store 62: the buffer control word store is a storage area that stores one control word for each interface adapter. Each BCW contains control bits plus a displacement field which is used to access the high speed data buffer 74 to thereby store or fetch data. Each time the buffer control word is accessed, the displacement field is incremented by means of an incrementor 64 and returned to its place in the storage. When the displacement field has been incremented to X111111, an interrupt is set to interrupt the buffer transmission unit 70. When a read sense pulse is received, the displacement is checked for zero and a microprogram interrupt is set in the equal or unequal end op interrupt stack. This mechanism insures a complete data transfer has taken place and requires data fields to be held to multiples of 64 bytes.

Block Transfer Unit 70: this unit controls the transfer of a block of 64 data bytes from the high speed data buffer 74 to main storage and vice versa. At the beginning of a write operation, the microprogram causes two 64 byte blocks to be fetched from main storage and stored in the high speed data buffer 74 at an address corresponding to the interface adapter that is to be involved in the write operation. Thereafter, additional interrupts are set to cause a block transfer when the displacement field of the buffer control word passes a 64 byte boundary. The microprogrammed control unit is equipped with control words similar to the BCW and contains the high speed data buffer displacement and main storage address to accomplish the block transfers.

Put Queue 72: the put queue 72 is the logic by which the micro-controller effects the transmission of a command to an interface adapter. When the write frame assignment logic 56 finds no outstanding write requests in the request queue 50, it searches the put queue 72 for a put frame assignment. If an entry is found in the put queue, the corresponding put queue control word (PQCW) is used to supply a displacement address from which to fetch a command byte from the high speed data buffer. This command is transmitted on the write data bus 26 together with the interface address on the write response address bus 28. If this command must be followed by a number of bytes containing parameters such as seek to a disk file, the interface adapter is instructed to request a certain number of control frames. When these requests are received, the write frame assignment logic services them with the aid of the BCW.

DBU MODES

The data buffer unit operates in one of the following modes, which are described in detail subsequently:

1. Send IA Commands
2. ID Verify
3. Search Directory
4. Read Data
5. Write ID
6. Write Data
7. Wait (for second End Op)
8. Null (at end of each sequence).

| Mode Sequences: | | |
|---|---|---|
| A) | 1, 2, 4 | — Read Data |
| B) | 1, 2, 3 | — Search Directory |
| C) | 1, 2, 4 | — Verify ID, Set Skip and Then go to SEQD (Write Data) |
| D) | 1, 5, 6 | — Write Data |
| E) | 1, 7 | — Send IA Commands and wait for Second End Op (Record Ready) |
| F) | 1, 4 | — Sense Status |
| G) | 1 | — Send IA Commands |

BCU (BUFFER CONTROL WORD) STORE

The contents of the buffer control word store, i.e., the BCW, the IA command table and the verify table are described below:

| BCW Format | |
|---|---|
| Bits 0 - 2: | MS — Mode Sequence |
| Bits 3 - 5: | CM — Current Mode |
| Bits 6 - 11: | RSC — Repetitive Sequence Counter |
| Bits 12 - 18: | D — Displacement |
| Bit 19: | S — Skip (RST by End Op) |
| Bit 20: | CE — Compare Equal |
| Bit 21: | FTT — First Time Through |
| Bit 22: | NDX — No Data Transfer to BTU |
| Bit 23: | AE — Abnormal End (Set by DBU Error) |
| Bit 24: | C — Carry |
| Bit 25: | A — Alert |
| Bit 26: | I — Interrupt |

| IA (1) Command Table | |
|---|---|
| CMD Count | |
| 16 Bytes/IA | IA Commands |

Verify Table

| Verify Byte | Function | Read ID Data |
|---|---|---|
| | 48 Bytes/IA | |

| Function Byte: | |
|---|---|
| Bit 0 — C | — Compare verify byte to read ID data byte. If unequal, reset BCW compare equal bit 20 no compare. |
| Bit 1 — U | — Update verify byte if compare equal bit 20 in BCW is active/no update. |
| Bit 2 — SE | — If BCW bit first time through (FTT) 21 is on and compare equal 20 is off, then set skip bit 19 in BCW/no setting of skip. |
| Bit 3 — SE | — Set skip bit 19 in BCW if CE 20 is on/no setting of skip. |
| Bit 4 — RD | — If no compare equal 20, then reset displacement bits 12-18 in BCW/ Don't reset displacement. |
| Bit 5 — CC | — Go to next current command, also if BCW compare equal 20 is off and FTT 21 is off, then cause abnormal end interrupt. |
| Bits 6 & 7 | — Not used. |

WRITE OPERATION

Figure 3:
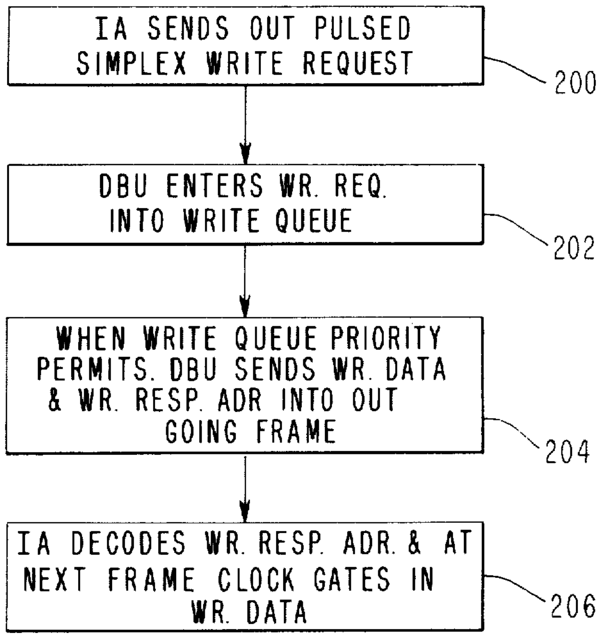
FIG. 3 is a flowchart describing the operation of the interface in response to a write request.

Referring now to FIG. 3, the write operation will be described with the aid of the timing diagram of FIG. 4.

At block 200 the interface adapter sens out a pulsed simplex write request 208 (FIG. 4) which is received at the data buffer unit. At block 202 the data buffer unit enters the write request into the request queue 50 (FIG. 2) at the corresponding interface adapter register.

Figure 4:
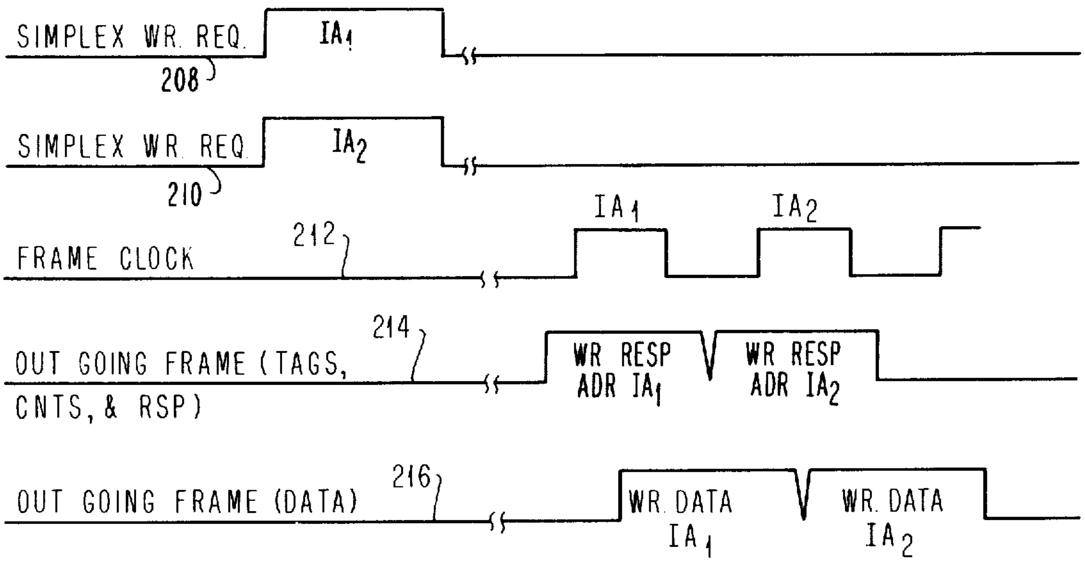
FIG. 4 is a timing diagram of the outgoing write response address and the write data bus shown in FIG. 1.

At block 204, when the write queue priority permits, the DBU sends the write data via bus 26 (FIG. 2) and write response address via line 28 (FIG. 2) into an outgoing frame 214, 216 (FIG. 4). Finally, at block 206, the interface adapter decodes the write response address and at the next frame clock gates in the write data.

Referring to FIG. 4, two simplex write requests 208 and 210 are shown for interface adapters 1 and 2 respectively. The write response onto the outgoing frame 214 is raised first with respect to interface adapter 1 and then with respect to interface adapter 2. Frame clock 212 then gates in the data onto the outgoing frame 216.

READ OPERATION

Figure 5:
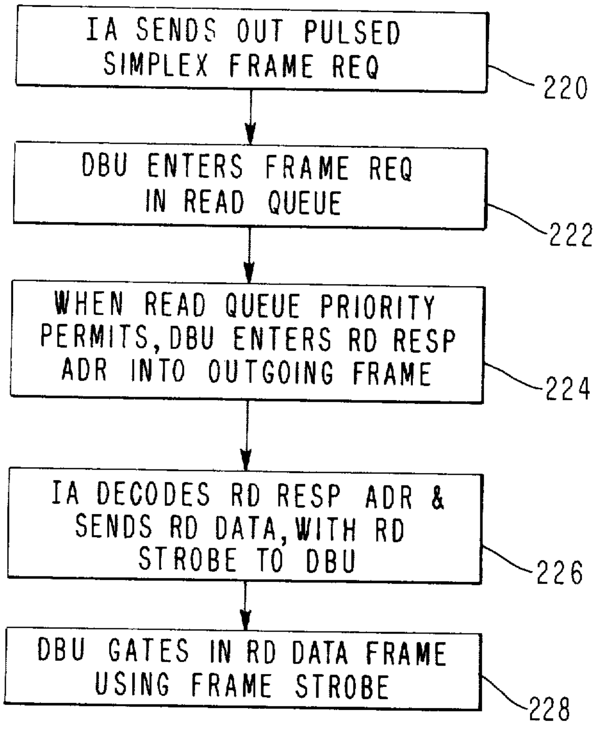
FIG. 5 is a flowchart describing the operation of the interface in response to a read request.

Referring now to FIG. 5, the read operation starts with block 220 wherein the interface adapter sends out a pulsed simplex frame request on the appropriate frame request line. At block 222, the DBU enters the frame request into the appropriate request queue 50, FIG. 2. At block 224, when the read queue priority within the read frame assignment block 54 (FIG. 2) permits, the DBU enters the read response address into an outgoing frame via line 30 (FIG. 2). The interface adapter decodes the read response address (block 226) and places read data on the read data bus 38 (FIG. 2) and energizes the read strobe line 36 (FIG. 2).

Finally, at block 228 the DBU gates in the read data frame using the frame strobe and places the data in the high speed data buffer 74, FIG. 2.

Figure 6:
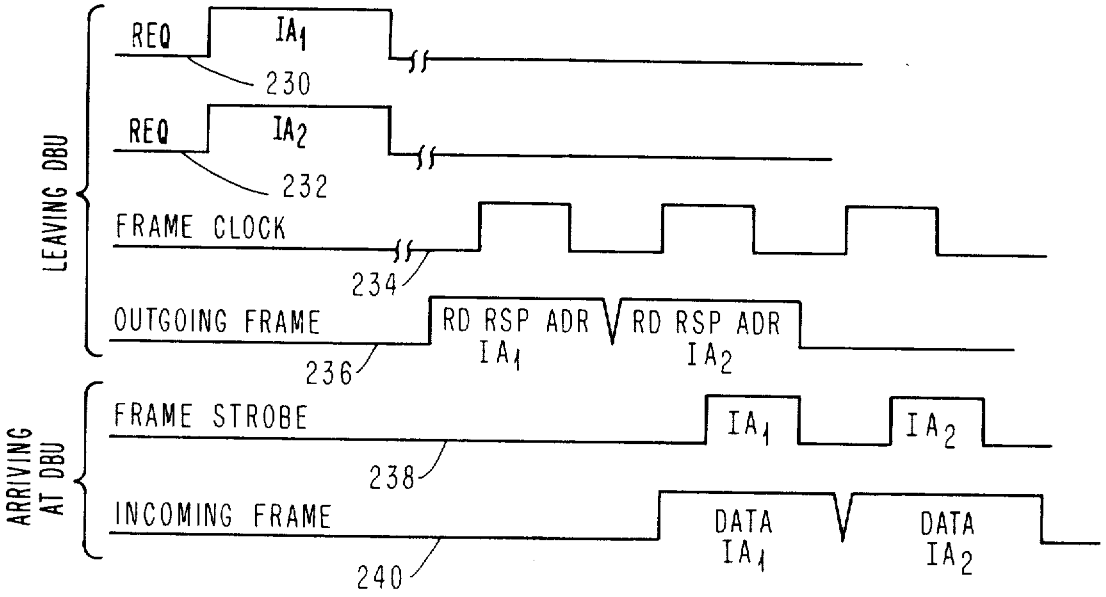
FIG. 6 is a timing diagram of the outgoing read response address and incoming read data bus shown in FIG. 1.

The timing diagram of FIG. 6 shows the timing for the above operation. The frame requests are illustrated by 230 and 232 for interface adapters 1 and 2 respectively. In response to the frame request, the outgoing frame line 236 is raised and clocked via line 234 to the interface adapter. The interface adapter responds by placing the data into the incoming frame 240 which is gated by the frame strobe 238.

DETAILED DESCRIPTION OF WRITE OPERATION

Figure 7:
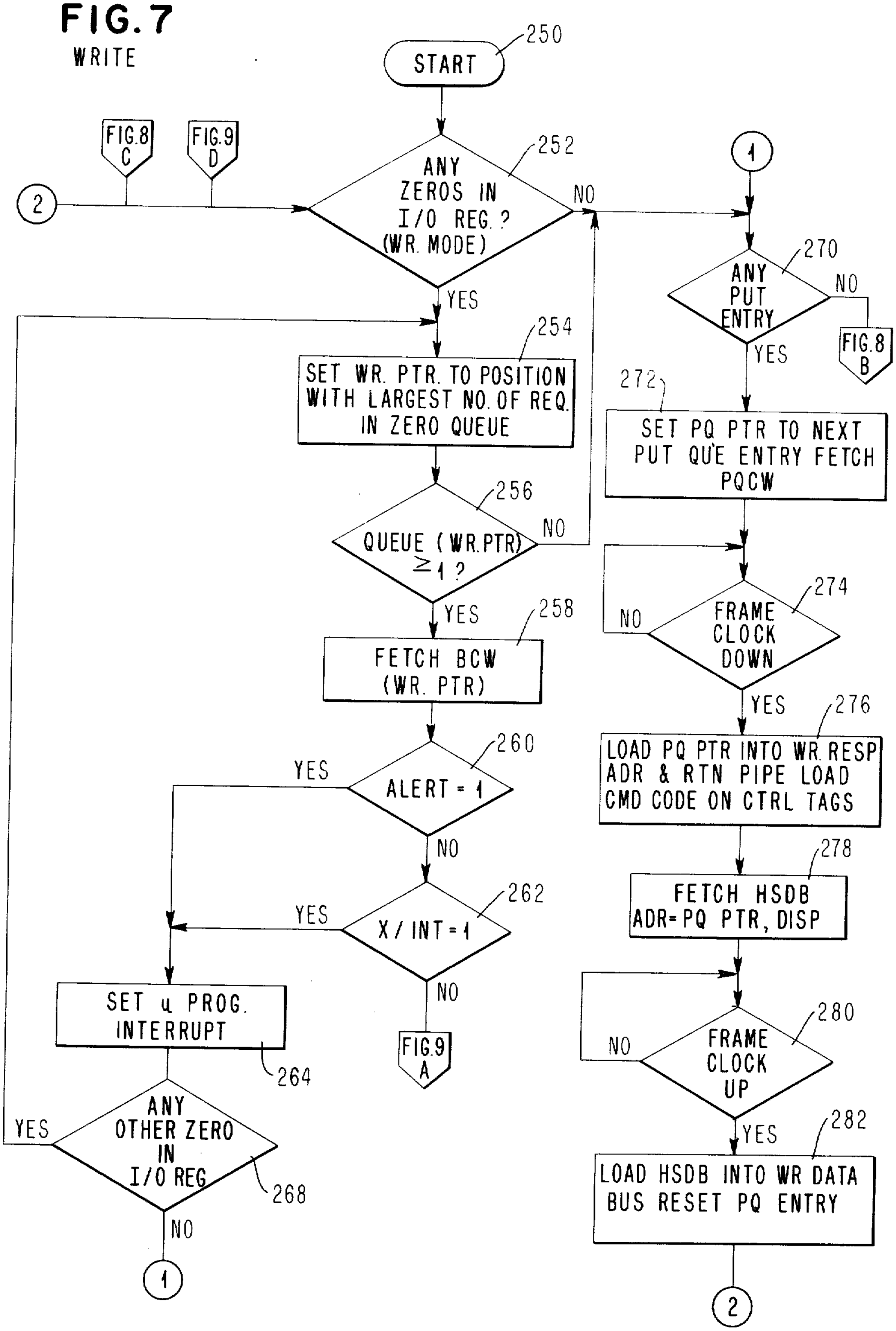
FIGS. 7, 8, and 9 comprise a flowchart representation of the write frame assignment logic block of FIG. 2.

Referring now to FIG. 7, the start 250 of the write operation begins with a test of the I/O register 52 (FIG. 2) to determine if any of the bits are in the zero state. If yes, write mode is indicated and the flow proceeds to block 254. The write pointer is set to the position in the request queue 50 which has the largest number of requests and which is indicated with a zero in the I/O register 52. Next a test is made at decision 256 to see if the write pointer in the queue is greater than or equal to one. If yes, the buffer control word is fetched at block 258. A decision is made 260 to determine if the alert fit in the BCW is on. If yes, a microprogram interrupt is set, block 264, in the interrupt register 78 (FIG. 2) and at decision 268 if there are any other zeros in the I/O register, the flow returns to block 254. If the alert line is negative of, the flow proceeds to decision 262 which determines if the interrupt bit in the BCW is on. If no, the flow proceeds to FIG. 9. At block 292 the logic waits until the frame clock is down. Then, block 294, the write pointer is loaded onto the write response address bus 28 and to the write return pipe 60 (FIG. 2). Next, the high speed data buffer address which gives the write pointer displacement is fetched block 296. If the displacement is equal to the amount in block 298, the flow proceeds to block 300 and the logic sets the write pointer and write mode bit into the interrupt stack.

The logic then waits for the frame clock to rise, block 302. When this occurs, the high speed data buffer is loaded into the write data bus at block 304. After modifying the contents of the buffer control word in block 306, the buffer control word is stored and the flow returns to FIG. 7 to repeat the operation.

Referring again to FIG. 7, if there are no zeros in the I/O register then a branch is taken to decision block 270. If there is a put entry in the I/O register, the flow proceeds to block 272. This sets the put queue pointer to the next put queue entry and fetches the put queue control word from the put queue 72 of FIG. 2.

Next, the logic waits for the frame clock to fall, block 274. When this occurs, the logic of block 276 loads the put queue pointer onto the write response address line 28, FIG. 2, and into the write return pipe 60 and loads the command code onto the control tags 32 of FIG. 2.

Next, at block 278, the high speed data buffer address equal to the put queue pointer with the appropriate displacement, is fetched. When the frame clock rises at block 280, the logic of block 282 loads the high speed data buffer into the write data bus and resets the put queue entry. The flow returns to the first block of FIG. 7.

Assuming that there are still no zeros in the I/O register, the flow continues to block 270. If at this point there are no more put entries, the flow proceeds to FIG. 8. At block 284, if the frame clock is down, the flow continues to block 286 which loads zeros into the write response address and indicates on the control tags no operation. When the frame clock rises at block 288, the logic of block 290 loads zeros into the write data bus and the flow returns to FIG. 7.

The last described operation will continue, that is, loading zeros into the write data bus until there is either a put entry indication or zeros occur in the I/O register.

DETAILED DESCRIPTION OF READ OPERATION

Figures 8, 9, 10:
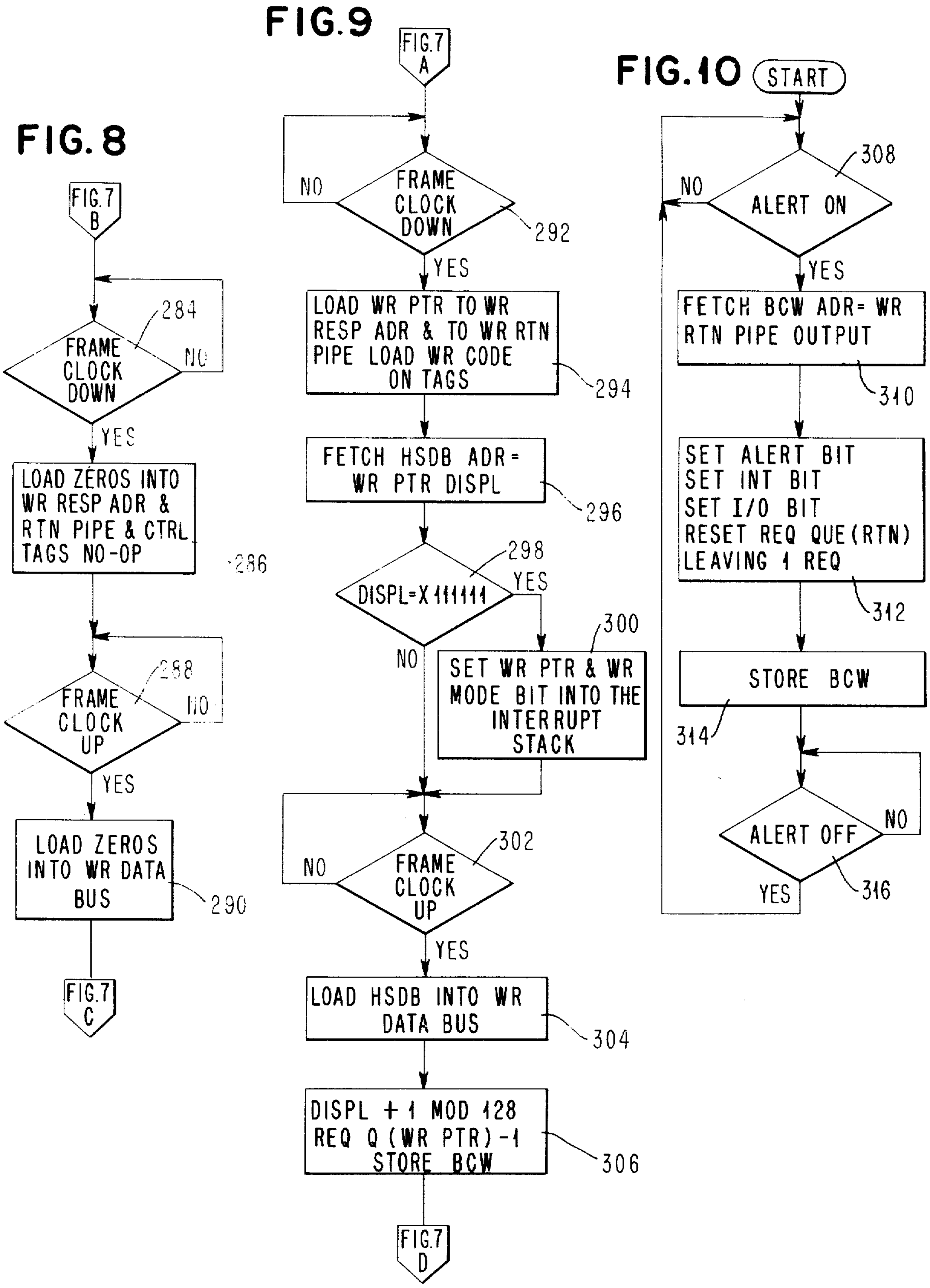
FIG. 10 is a flowchart representation of the logic for handling the alert line shown in FIG. 1.

When it is the proper time for the interface adapter to change its operation from a write operation to a read operation it will recognize its address on the write response line 28 of FIG. 2, it raises the alert line 40. This causes the data buffer unit to switch from write mode to read mode and resets all requests in the corresponding queue in the request queue 50 except the one which has issued the alert. The alert line ends the command or a write transmission and requests a read frame for the purpose of returning status to the data buffer unit. Referring to FIG. 10, when the alert rises at block 308, the write return pipe output 61 is used as an address to fetch the BCW from the buffer control word store 62 (logic block 310).

At logic block 312 the alert bit, interrupt bit, and I/O bit are set in the BCW and the request queue is reset leaving only one request which has become the read request. The BCW is then stored at logic block 314 and the alert falls block 316.

Figure 11:
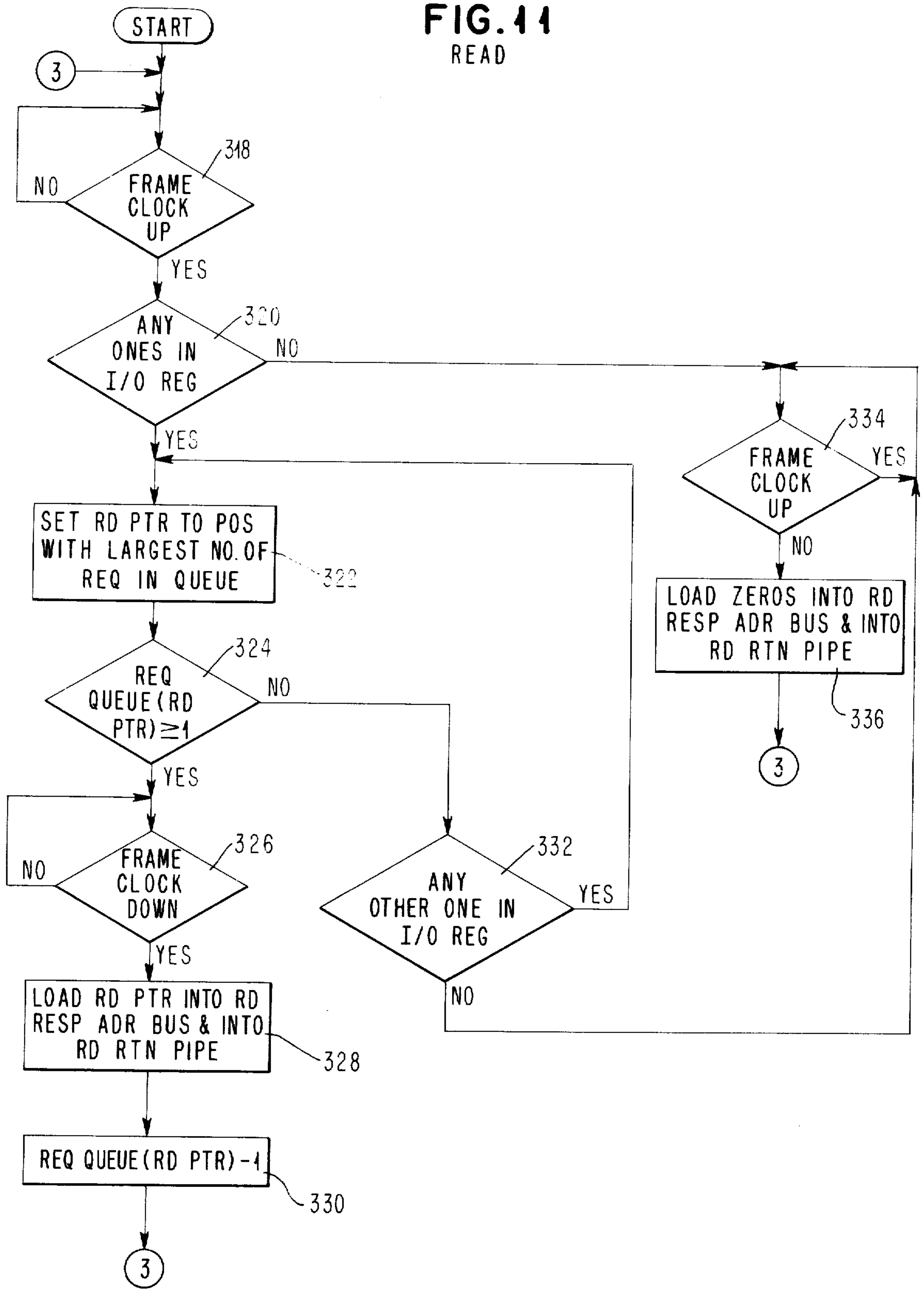
FIG. 11 is a flowchart representation of the hardware logic of the read frame assignment logic block No. 54 of FIG. 2.

Referring to FIG. 11, when the frame clock rises at block 318, decision block 320 tests to see if there are any 1's in the I/O register 52 of FIG. 2. If no, there is no read request and the flow proceeds to block 334 and when the frame clock drops, the flow proceeds to block 336 and zeros are loaded onto the read response address bus and into the read return pipe and the flow returns to logic block 318.

If there is a 1 in the I/O register, the flow proceeds to block 322. Here the read pointer is set to the position with the largest number of requests in the queue. At block 324, a test is made to determine if the request queue read pointer is equal to or greater than 1. If no, the flow proceeds to decision block 332, and a test is made to see if there are any other 1's in the I/O register. If no, the previously described loop for loading zeros into the read response address bus is entered. If yes, the flow returns to block 322. At block 326, when the frame clock falls, the logic of block 328 loads the read pointer into the read response address bus and into the read return pipe. At block 330, the request queue read pointer is decremented by 1 and the flow returns to block 318.

Figure 12:
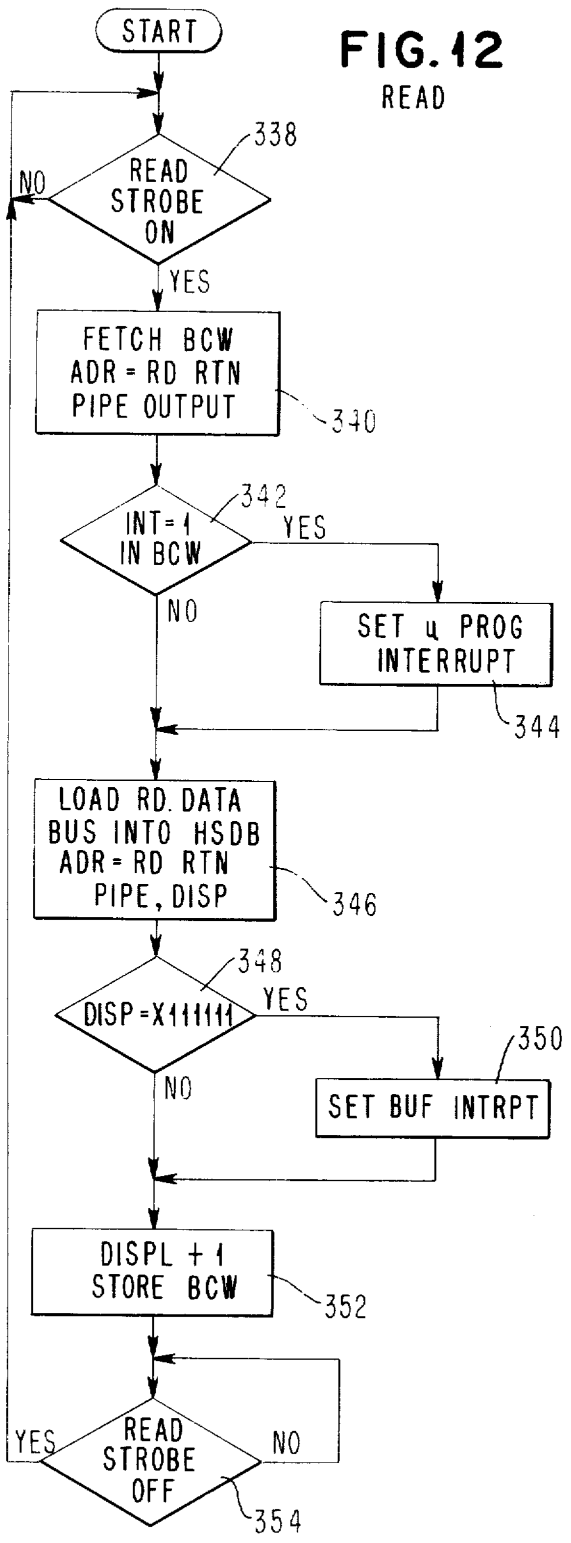
FIGS. 12 and 13 are flowchart representations of the hardware logic of the read data and sense frame logic block of FIG. 2.

Referring to FIG. 12, if the read strobe is on, block 338, the BCW is fetched from the address which is equal to the read return pipe output at logic block 340. If the interrupt bit is equal to 1 in the BCW, the microprogram interrupt is set by logic block 344.

The flow continues to block 346 which loads the read data bus into the high speed data buffer at an address equal to the read return pipe plus the displacement. If the displacement is equal to the predetermined amount shown in block 348, an interrupt is sent to the buffer controls at block 350. The displacement is incremented at block 352 and the BCW is stored. When the read strobe falls, the flow returns to block 338.

Figure 13:
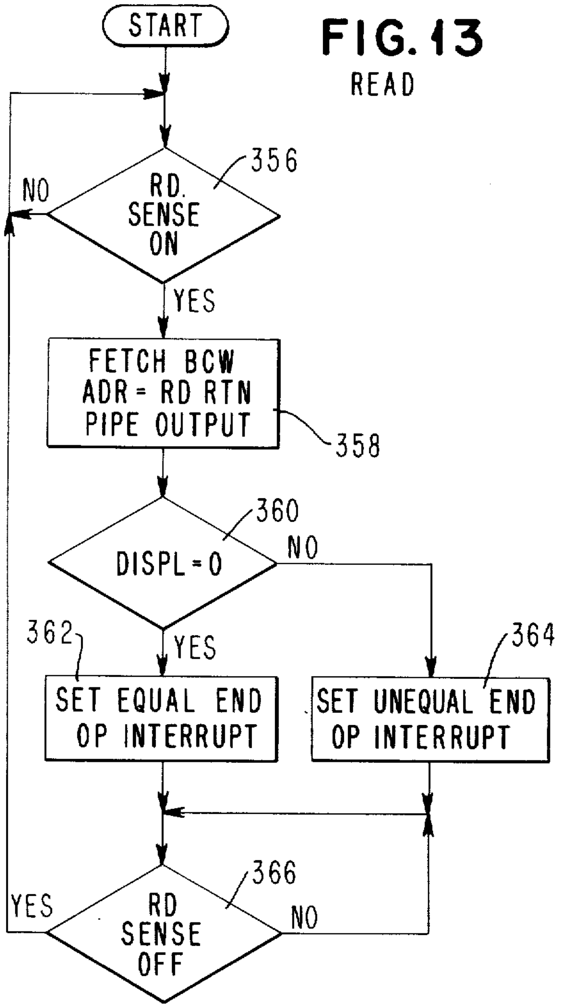

Referring to FIG. 13, when the read sense is on at block 356, the BCW is fetched from the address which is equal to the read return pipe output block 358. If the displacement is equal to zero, the logic sets the equal end operation interrupt, block 362. If no, the logic sets the unequal end operation interrupt block 364. When the read sense falls, the flow returns to block 356.

SUMMARY OF OVERALL OPERATION

Referring now to FIGS. 14, 15, 16 and 17, the operation of the entire system including the microcode controller, the data buffer unit, and the interface adapters will be described with respect to the eight modes of operation within the DBU.

MODE 1 — SEND INTERFACE ADAPTER COMMANDS

Figure 14:
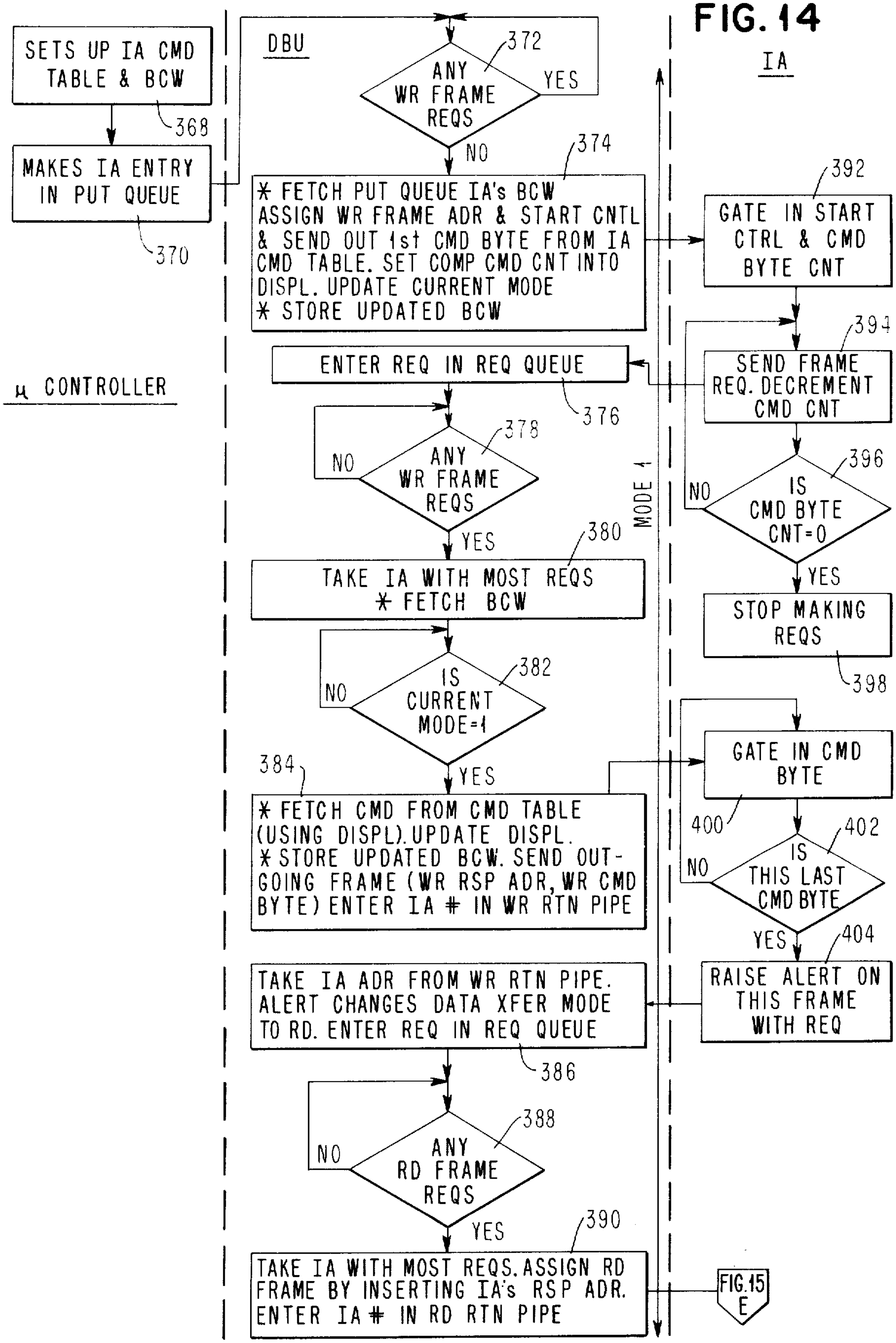
FIGS. 14, 15, 16 and 17 comprise a flowchart describing the operation and interaction between the micro-controller, the data buffer unit, and the interface adapters of FIG. 1.
Figure 15:
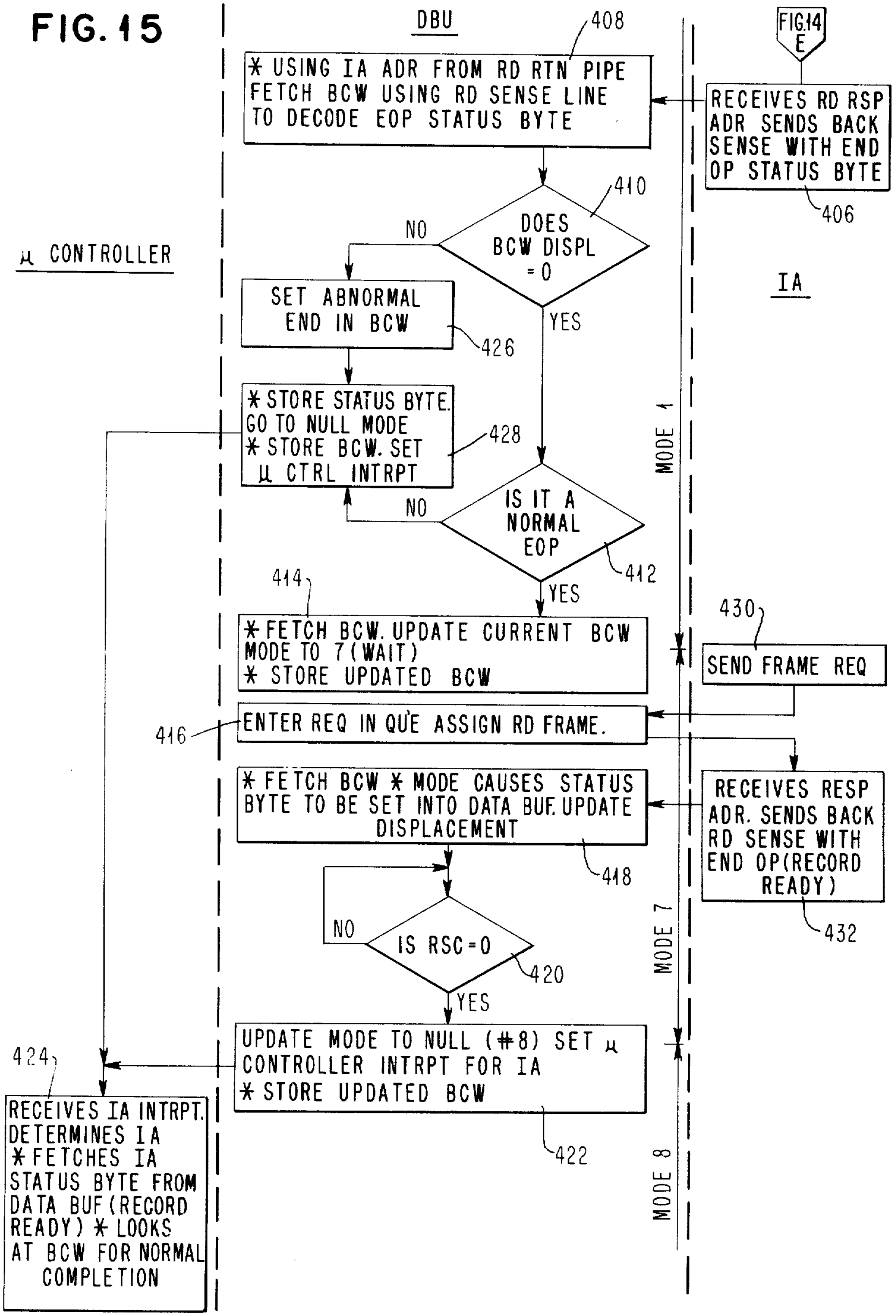

Referring to FIG. 14, the microcode controller at block 368, sets up the interface adapter command table and the buffer control word and at block 370 makes an interface adapter entry in the put queue 72 of FIG. 2.

The DBU at block 372 tests to see if any write frame request exists. If no, flow proceeds to the logic block 374. The DBU then fetches the BCW, assigns a write frame address and starts the control; sends out the first command byte from the interface adapter command table, sets the complement of the command count into the displacement; and updates the current mode. It then stores the updated BCW. In response to this operation, the interface adapter at block 392 gates in the start control and command byte count then sends a frame request and decrements the command count block 394. If the command count is equal to zero, block 396, the interface adapter stops making requests, block 398.

In response to the frame request, the DBU enters the request into the request queue 50 of FIG. 2 as illustrated by block 376. The decision block 378 tests for any write frame requests. If yes, the logic responds to the interface adapter with the most requests and fetches the BCW, block 380. If the current mode is equal to 1, block 382, the logic proceeds to block 384. Here the logic fetches a command from the command table using the displacement and updates the displacement. The updated BCW is stored and the outgoing frame is sent which includes a write response address and a write command byte. The interface adapter number is entered into the write return pipe.

In response to this, the interface adapter gates in the command byte, block 400, and if this is the last command byte block 402, it raises alert on this frame with the request at block 404.

In response to the alert line 40 of FIG. 2, the DBU takes the interface adapter address from the write return pipe to identify the appropriate interface. The alert changes the data transfer mode to read and the request is entered into the request queue using the interface address from the return pipe.

The IA continues to send read data blocks 466 and 468 until the complete data record has been sent to the DBU. The IA, block 470, then sends the EOP status with read sense information.

If there are any read frame requests, block 388, flow proceeds to block 390. The logic takes the interface adapter with the most requests and assigns a read frame by inserting the interface adapter read response address and enters the interface adapter number into the read return pipe. The flow proceeds to FIG. 15. The interface adapter receives the read response address and sends back sense data with the end op status byte at logic block 406. In response to this, the DBU fetches the BCW using the interface address from the read return pipe. It also uses the read sense line to decode the end op status byte. If the BCW displacement is not equal to zero at decision 410, the logic sets abnormal end in the BCW, block 426. Then at block 428, it stores the status byte and goes to null mode (mode 8). It then stores the BCW and sets the micro control interrupt in register 78 of FIG. 2.

In the micro controller at block 424, the controller receives the interface adapter interrupt and fetches the interface adapter status byte from the data buffer and examines the BCW for normal completion.

If, at block 410, the BCW displacement is equal to zero, the flow proceeds to block 412. If it is a normal end op, the flow proceeds to block 414 and the operation is completed by fetching the BCW and updating the current BCW mode to mode 7, which is wait. The updated BCW is then stored in the buffer control word store 62.

MODE 7 — WAIT (FOR SECOND END OP)

In the wait mode, the interface adapter, when ready to send status, sends a frame request to the DBU as shown in block 430. In response to this, the DBU enters the request into the request queue and assigns a read frame. The interface adapter at block 432, receives the response address and sends back read sense with end op.

In response to this, the DBU at block 418, fetches the BCW and the mode causes the status byte to be set into the data buffer. The logic then updates the displacement. If the repetitive sequence counter (RSC) is zero, the flow transfers to block 422. The mode is updated to null (mode 8) and the micro control interrupt is set for the interface adapter. Finally, the updated BCW is stored.

At block 424, the micro controller receives the interface interrupt and proceeds as previously described.

MODE 2 — ID VERIFY

Figure 16:
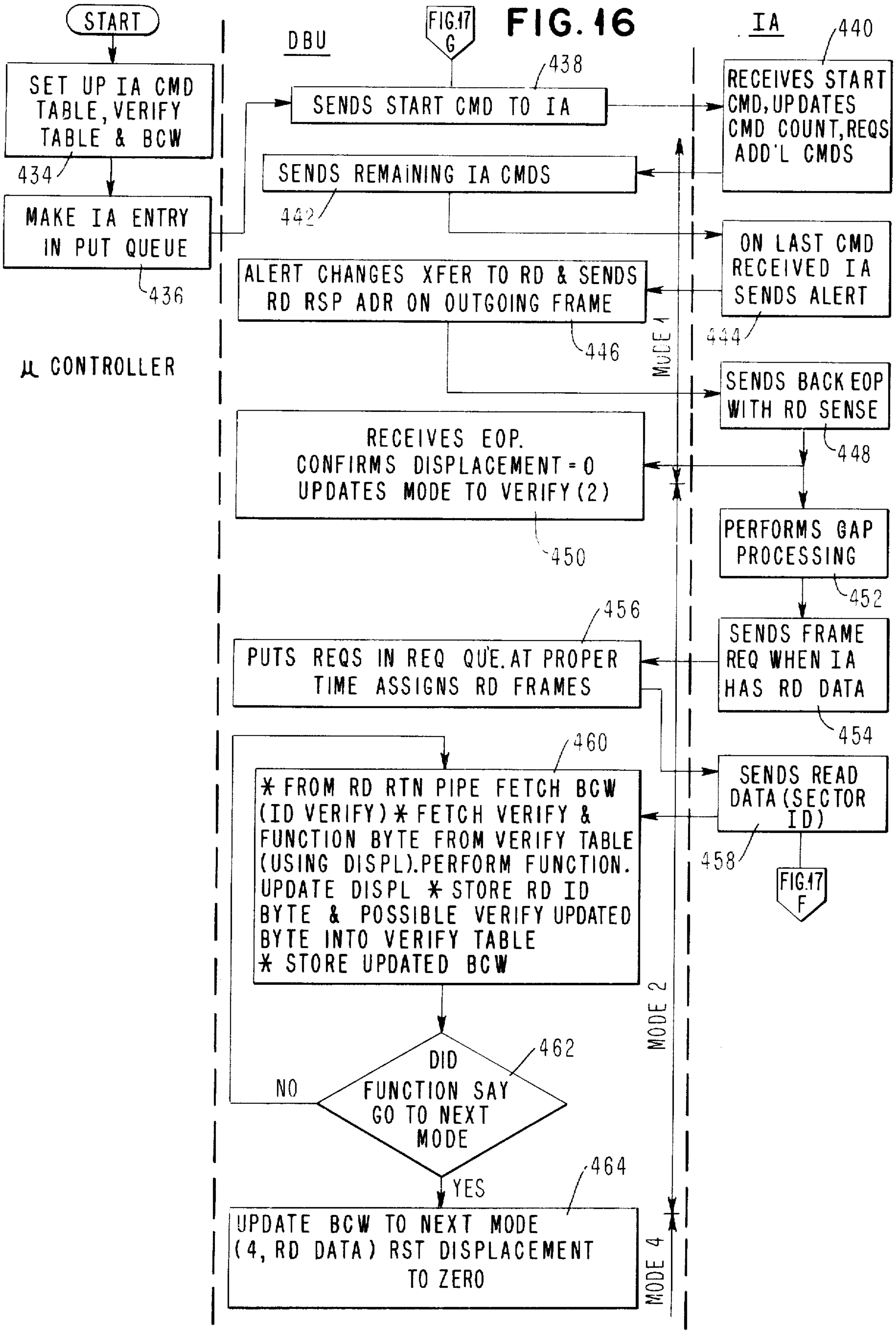

Referring now to FIG. 16, the flow is entered at block 434 which sets up the interface adapter command table, verify table and buffer control word. The micro controller also makes an interface adapter entry into the put queue at logic 436. In response to this, the DBU sends a start command to the interface adapter, block 438. The interface adapter responds to this at block 440, receives the start command, updates the command count and requests additional commands. The DBU at block 442 then sends the remaining interface commands and the interface adapter at block 444 on the last command received, responds by raising the alert line. At the DBU, block 446, the alert line changes the transfer direction to read and sends read response address on the outgoing frame. In response to this, the interface adapter sends back end op with read sense, block 448. The DBU at block 450 receives the end op, confirms that the displacement is equal to zero and updates the mode to verify (mode 2). The interface adapter performs gap processing, block 452, and sends the frame request when the interface adapter has read data to send, block 454. The DBU, at block 456, puts the request into the request queue and at the proper time assigns read frames. The interface adapter, at block 458, sends the read data sector ID. The DBU in response to this at block 460, fetches the BCW using the address in the read return pipe for the ID verify function. Logic fetches verify and function byte from the verify table using the displacement. After performing the verify function, the displacement is updated and the read ID byte is stored and the updated verify byte is stored into the verify table. Finally, the updated BCW is stored in the BCW store.

If the function performed at block 460 indicates the next mode, the BCW is updated to the next mode which is read data (mode 4) and the displacement is reset to zero as indicated by the logic block 464.

Figure 17:
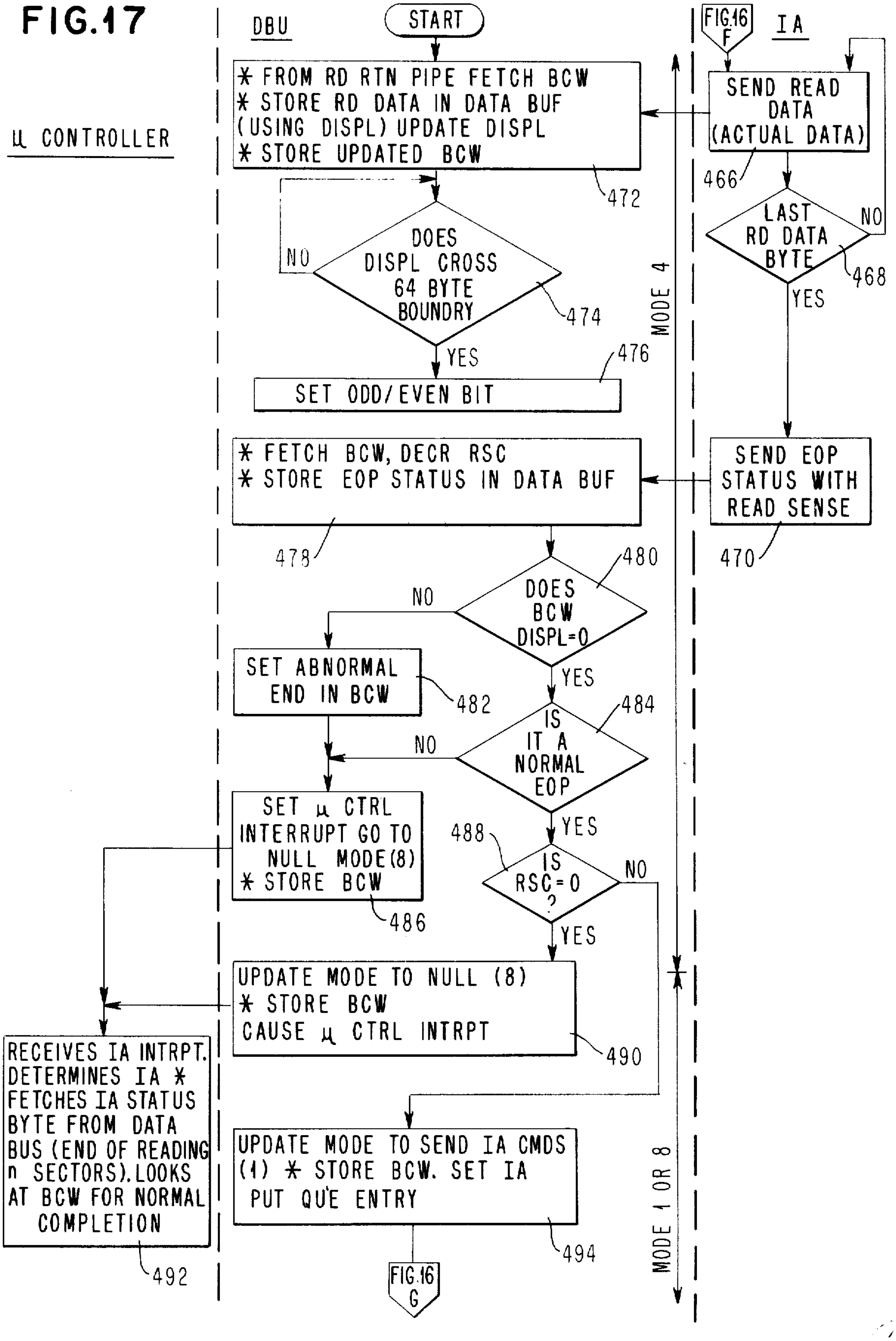

The logic continues on FIG. 17 wherein at block 466 the interface adapter sends the read data to the DBU. The DBU using the address stored in the read return pipe, fetches the BCW and stores the read data in the data buffer using the displacement, updates the displacement and stores the updated BCU (block 472).

A check is made by the logic 474 to determine if the displacement crosses a 64 byte boundary. If yes, the on-/even bit in the buffer controls is set.

In block 478, the BCW is fetched and the repetitive sequence counter is decremented. The end op status is stored in the data buffer.

If the BCW displacement is unequal to zero, the abnormal end is set in the BCW block 482. If the BCW displacement is equal to zero and it is a normal end op, a check is made to see if the repetitive sequence counter is equal to zero. If yes, the mode is changed to mode 8 (null), the BCW is stored and the micro control word interrupt is set.

The micro controller at block 492 receives the interface adapter interrupt, determines which interface adapter is active and fetches the interface adapter status byte from the data bus and looks at the BCW for normal completion.

If the repetitive sequence counter is not equal to zero at block 488, the mode is changed to mode 1, command mode, the BCW is stored and the PUT QUEUE entry for the interface adapter is set. The flow returns to block 438 on FIG. 16 and the operation continues until the repetitive sequence counter is equal to zero.

SUMMARY OF WRITE AND READ SEQUENCES

Figure 18:
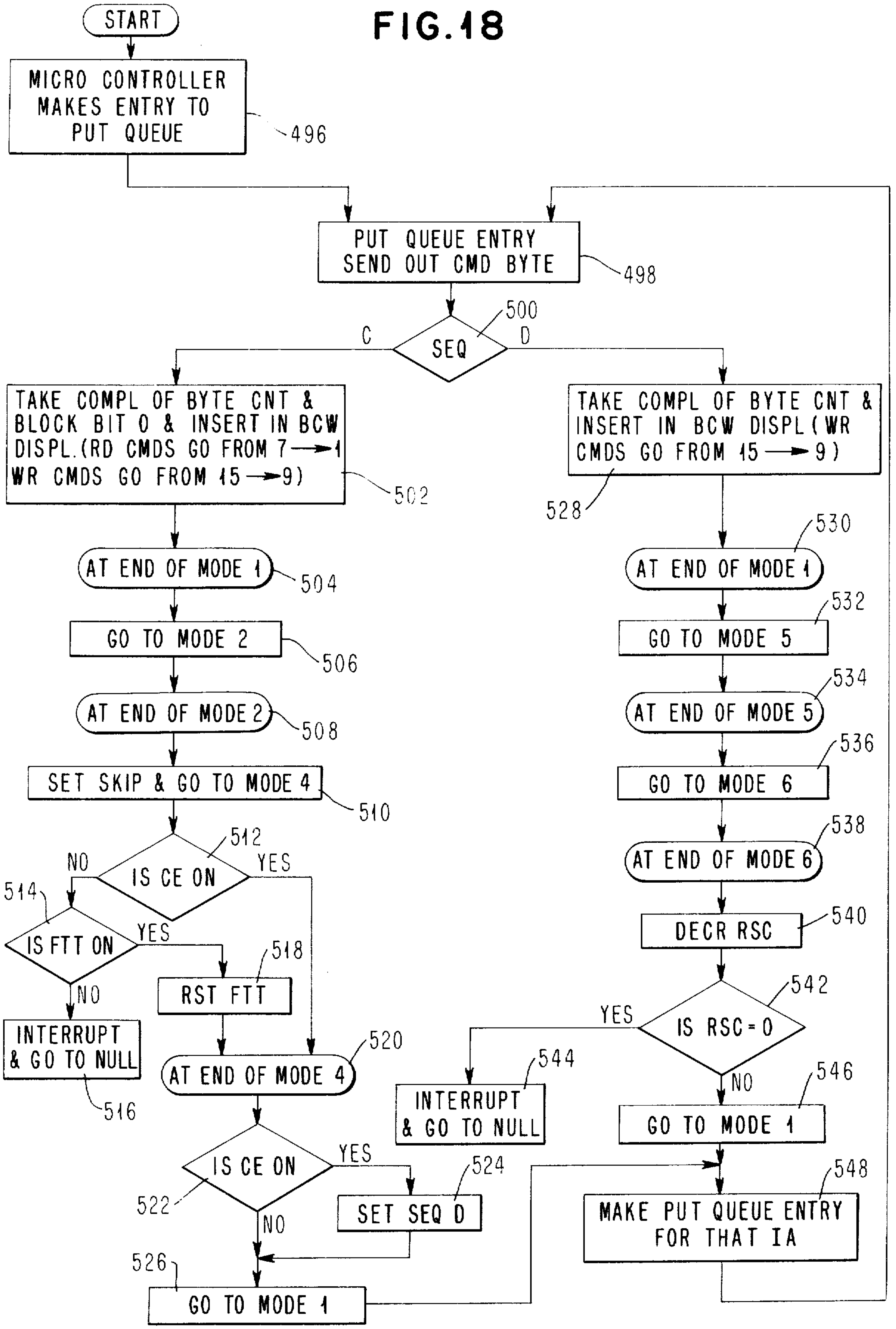
FIG. 18 is a flowchart representation of the operation of the micro-controller of FIG. 1 with respect to put queue operation.

Referring to FIG. 18, the write and read sequences within the data buffer unit as controlled by the micro controls will be described.

At block 496, the micro controls make an entry into the put queue 72 shown in FIG. 2.

At block 498, a command byte is transmitted to the interface adapter. At block 500, a test is made as to which sequence has been set. If sequence C, then the controls are sequenced through modes 1, 2 and 4 to thereby verify the ID, set a skip function and transfer to sequence D which is write data.

At block 502, the read and write commands are inserted into the buffer control word and at the end of mode 1, after the commands have been sent to the interface adapter, the sequence goes to mode 2, ID verify. At the end of mode 2, mode 3 is skipped and the controls go to mode 4 at block 510.

At block 512, a test is made of the compare equal bit of the BCW. If not on, the controls go to decision 514 wherein the FTT (First Time Through) bit is tested. If not on, an interrupt is posted and the mode goes to null mode 8 at block 516. If the FTT bit is on, it is reset at block 518 and at the end of mode 4, block 520, a test is again made to see if the compare equal is on, block 522. If yes, sequence D is set at block 524. If no, the controls are left in sequence C. In either case, sequence goes to mode 1 at block 526. At block 548, a put queue entry is made for the interface adapter corresponding to this BCW and the controls return to block 498.

If sequence D had been set at block 524, then at block 500 the sequence D path is taken. At block 528, commands are sent to the interface adapter and at the end of mode 1, at block 530, the controls go to mode 5 which is the write identify mode. At the end of mode 5, the controls go to mode 6, block 536, to write data. At the end of mode 6, at block 538, the controls decrement the repetitive sequence count block 540. A test is made at block 542 to see if the RSC has been reduced to zero. If yes, an interrupt is posted and the controls go to null mode, block 544. If no, the controls return to mode 1 block 546. An entry is put into the put queue for the interface adapter corresponding to the BCW and the sequence continues until the RSC is reduced to zero.

The above micro controls have been only briefly described as they do not form a part of the present invention which may be practiced with any type of controls which are compatible with the loop interface herein described.

While the invention has been particularly shown and described with reference to a preferred embodiment thereof, it will be understood by those skilled in the art that various changes in form and detail may be made therein without departing from the spirit and scope of the invention.

What is claimed is:

1. A communication mechanism for use between computer subsystems and a data processor comprising:

a first parallel multiplexed data path outgoing from said data processor, connecting the subsystems in a first chain;

a second parallel multiplexed data path incoming to said data processor, connecting the subsystems in a second chain, which second chain, in combination with said first chain, forms a closed multiplexed loop including within said loop said computer subsystems and said data processor;

a plurality of simplex frame request lines connected between said subsystems and said data processor, one such line for each said subsystem; and means in said data processor, connected to said frame request lines and said first data path, for sending information over said first data path in response to a request signal received on one of said request lines, said information including an address identifying the subsystem corresponding to said one of said request lines.

2. The combination in accordance with claim 1 further comprising:

frame clock means associated with said first data path wherein each unit of data transfer is constrained within a time frame defined by said frame clock which generates signals which are transmitted on said first data path; said frame clock means including means operable during the first half of each frame, for conditioning two sets of addresses on said first data path to define (1) a write address of data or commands appearing on said first data path and (2) a read address to define data appearing on said second data path.

3. The combination according to claim 2 including means for pulsing said simplex frame request line provided from each subsystem once for each request, said pulsing means operable during the second half of each of said frames, and means within said data processor including a queue into which manifestations representing said requests are placed whereby the subsystem with the largest number of requests may be assigned the next outgoing frame so that priority is allocated on the basis of utilization rather than position in said loop.

4. A communication mechanism for use between a series of subsystems, including a first and last subsystem, and a data processor comprising:

a multi-line multiplexed outgoing data path originating at said data processor connecting the subsystems in series with each other and said data processor and terminating at said last subsystem;

a multi-line multiplexed incoming data path originating at said first subsystem connecting the subsystems in series with each other and said data processor and terminating at said data processor;

a plurality of simplex frame request lines connected between said subsystems and said data processor, one such line for each said subsystem; and means in said data processor, connected to said frame request lines and said outgoing data path for sending information over said outgoing data path in response to a request signal received on one of said request lines, said information including an address identifying the subsystem corresponding to said one of said request lines.

5. The combination in accordance with claim 4 further comprising:

frame clock means associated with said first data path wherein each unit of data transfer is constrained within a time frame defined by said frame clock which generates signals which are transmitted on said first data path; said frame clock means including means operable during the first half of each frame, for conditioning two sets of addresses on said first data path to define (1) a write address of data or commands appearing on said first data path and (2) a read address to define data appearing on said second data path.

6. The combination according to claim 5 including means for pulsing said simplex frame request line provided from each subsystem once for each request, said pulsing means operable during the second half of each of said frames, and means within said data processor including a queue into which manifestations representing said requests are placed whereby the subsystem with the largest number of requests may be assigned the next outgoing frame so that priority is allocated on the basis of utilization rather than physical position.

7. A communication mechanism for use between a series of subsystems, including a first and last subsystem, and a data processor comprising:

a multi-line multiplexed outgoing data transmission medium originating at said data processor connecting the subsystems in series with each other and said data processor and terminating at said last subsystem;

a multi-line multiplexed incoming data transmission medium originating at said first subsystem connecting the subsystems in series with each other and said data processor and terminating at said data processor;

a simplex frame request line provided from each subsystem to said data processor, one such line for each said subsystem; and frame clock means associated with said outgoing data transmission medium wherein each unit of data transfer is constrained within a time frame defined by said frame clock which generates signals which are transmitted on said outgoing data transmission medium, said frame clock means including means for conditioning addresses on said outgoing data path to define data appearing on said outgoing data path;

the effective length of the incoming and outgoing transmission media between subsystems being equal in order to maintain proper frame timing and to insure proper sequencing of frames on said incoming cable.

8. The combination in accordance with claim 5 wherein said multi-line multiplexed incoming data path includes a read strobe line;

means at each subsystem for energizing said read strobe line to thereby indicate that read data on said incoming data path is valid; and a read return pipe in said data processor into which is stored a read address as it is transmitted on said outgoing data path, said read return pipe including delay means to insure that said address arrives at the output of said read return pipe at the same time as the read data to thereby identify the source of the incoming read data.

9. The combination in accordance with claim 8 wherein said multi-line multiplexed incoming data path includes an additional strobe line for identifying control data to thereby distinguish said control data from said read data.

10. The combination in accordance with claim 5 wherein said multi-line multiplexed incoming data path includes a first alert line;

means at each subsystem for energizing said alert line to inform said data processor that the outgoing data transmission has been terminated and to request an incoming frame for the purpose of transmitting a message to the processor; and a write return pipe in said data processor into which is stored a write address as it is transmitted on the outgoing data path, said write return pipe including delay means to insure that said write address arrives at the output of the said write return pipe at the same time as the write data to thereby identify the source of the incoming alert.

11. The combination in accordance with claim 10 wherein said multi-line multiplexed incoming data path includes an additional alert line, and means at each subsystem for energizing said additional alert line independent of said first alert line with the purpose of requesting a different service from the processor, said alert lines energized by the subsystem whose address appears on the outgoing write address line and which is in the mode of receiving outgoing data, whereby said subsystem, not having an allocated incoming frame, may send specified messages to the processor by means of said alert lines.

* * * * *